(12) United States Patent
Behling et al.

(10) Patent No.: US 12,339,657 B2
(45) Date of Patent: Jun. 24, 2025

(54) DEVICE, METHOD FOR CONTROLLING THE SAME, AND DEVICE GROUP OR SWARM

(71) Applicant: Fraunhofer-Gesellschaft zur Förderung der angewandten Forschung e.V., Munich (DE)

(72) Inventors: Jan Behling, Dortmund (DE); Mathias Rotgeri, Dortmund (DE); Jan Sören Emmerich, Dortmund (DE); Dirk Höning, Dortmund (DE); Patrick Klokowski, Dortmund (DE); Christian Hammermeister, Dortmund (DE); Michael Ten Hompel, Dortmund (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 348 days.

(21) Appl. No.: 17/590,991

(22) Filed: Feb. 2, 2022

(65) Prior Publication Data

US 2022/0155779 A1    May 19, 2022

Related U.S. Application Data

(63) Continuation of application No. PCT/EP2020/072174, filed on Aug. 6, 2020.

(30) Foreign Application Priority Data

Aug. 9, 2019  (DE) ............... 10 2019 211 984.0

(51) Int. Cl.
*G05D 1/00*  (2024.01)

(52) U.S. Cl.
CPC ......... *G05D 1/0027* (2013.01); *G05D 1/0094* (2013.01); *G05D 1/0212* (2013.01)

(58) Field of Classification Search
CPC .. G05D 1/0027; G05D 1/0094; G05D 1/0212; G05D 2201/0216; G05D 1/0234; G05D 1/0246; G01S 5/16
See application file for complete search history.

(56) References Cited

U.S. PATENT DOCUMENTS 9,427,874 B1 *  8/2016  Rublee ............... B25J 11/0075
2007/0069026 A1  3/2007  Aoyama
(Continued)

FOREIGN PATENT DOCUMENTS

DE   103 35 568 A1   2/2005
EP   3 153 940 A1   4/2017
(Continued)

OTHER PUBLICATIONS

Chinese language office action dated May 6, 2023, issued in application No. CN 202080056581.4.
(Continued)

*Primary Examiner* — Khoi H Tran
*Assistant Examiner* — Tien Minh Le
(74) *Attorney, Agent, or Firm* — McClure, Qualey & Rodack, LLP

(57) ABSTRACT

A device includes an optical sensing unit configured to sense an object so as to obtain a picture of the object. The device includes a drive unit configured to drive and to move the device. The device includes an evaluation unit configured to evaluate the picture in terms of an at least two-dimensional pattern and to evaluate the pattern in terms of at least a first marking area and a second marking area. The evaluation unit is configured to obtain a marking result by comparing the first marking area and the second marking area, and to
(Continued)

determine, on the basis of the marking result, relative localization of the device with regard to the object. The device includes a control unit configured to control the drive unit on the basis of the relative localization.

29 Claims, 10 Drawing Sheets

(56) References Cited

U.S. PATENT DOCUMENTS

| | | | | |
|---|---|---|---|---|
| 2014/0342834 | A1* | 11/2014 | Tappeiner | A63F 13/00 463/42 |
| 2016/0091899 | A1* | 3/2016 | Aldred | B60L 50/52 901/1 |
| 2017/0225891 | A1* | 8/2017 | Elazary | G05D 1/0234 |
| 2018/0022405 | A1* | 1/2018 | Gecchelin | G05D 1/0088 701/23 |
| 2020/0242544 | A1* | 7/2020 | Galluzzo | B25J 9/1666 |
| 2021/0027033 | A1* | 1/2021 | Howard | G06V 20/582 |

FOREIGN PATENT DOCUMENTS

| | | |
|---|---|---|
| JP | 2012-143986 A | 8/2012 |
| WO | 2011/160006 A1 | 12/2011 |
| WO | 2018/041408 A1 | 3/2018 |

OTHER PUBLICATIONS

English language translation of office action dated May 6, 2023 (pp. 1-14 of attachment).

International Search Report and Written Opinion dated Oct. 29, 2020, issued in application No. PCT/EP2020/072174.

English language translation of International Search Report dated Oct. 29, 2020, issued in application No. PCT/EP2020/072174 (pp. 32 and 33 of attachment).

* cited by examiner

DEVICE, METHOD FOR CONTROLLING THE SAME, AND DEVICE GROUP OR SWARM

CROSS-REFERENCES TO RELATED APPLICATIONS

This application is a continuation of copending International Application No. PCT/EP2020/072174, filed Aug. 6, 2020, which is incorporated herein by reference in its entirety, and additionally claims priority from German Application No. DE 10 2019 211 984.0, filed Aug. 9, 2019, which is incorporated herein by reference in its entirety.

The present invention relates to a device which can determine its own relative localization with regard to surrounding objects and which controls, on the basis thereof, drive means for its own locomotion. The present invention further relates to a device group, or swarm, comprising a plurality of such devices, to a method of controlling a device, as well as to a computer program. In addition, the present invention relates to recognition of other participants in the system and their orientations via lateral patterns located on transport vehicles.

BACKGROUND OF THE INVENTION

When several mobile robots are used which cooperate with one another or with other infrastructure that is capable of interaction, the problem of unambiguous recognition and identification of the surrounding interaction partners arises. In relatively complex processes, it is not only useful to recognize the other participants, but there may also exist other requirements such as recognition of their spatial orientations, so as to enable, e.g., docking operations for load transfer between two robots or so as to be able to interpret the direction of travel of the other participants. In highly dynamic systems, said recognition additionally is to be effected as fast as possible and is not to take up too many resources (CPU/GPU power) on the existing hardware.

Known solutions have been primarily dependent on the type of the robot swarm used. In systems comprising central localization, wherein one server coordinates all participants, it is possible to communicate the positions of the surrounding vehicles to all robots via regular radio communication. In distributed systems, vehicles may span a mesh network for communication, via which they can communicate their respective current position to the surrounding participants. For docking operations at stations or the like, so called "landmarks" or barcodes/QR codes which can be recognized by a scanner are sometimes used.

There is a need for devices, methods of controlling same and for device groups which enable reliable relative localization of the device with regard to an object.

SUMMARY

According to an embodiment, a device may have: an optical sensing unit configured to sense an object so as to obtain a picture of the object; a drive unit configured to drive and to move the device; an evaluation unit configured to evaluate the picture in terms of an at least two-dimensional pattern, and to evaluate the pattern in terms of at least a first marking area and a second marking area so as to obtain a marking result by comparing the first marking area and the second marking area; and to determine, on the basis of the marking result, relative localization of the device with regard to the object; a control unit configured to control the drive unit on the basis of the relative localization; wherein the drive unit is configured to move the device along a direction of movement; wherein the optical sensing unit is configured to sense the object along or in parallel with the direction of movement.

According to another embodiment, a device group may have: a plurality of inventive devices; wherein the plurality of devices include, on at least one surface, a device pattern indicating at least one object side or an object identity; wherein the plurality of devices are configured to orient themselves, in relation to one another, on the basis of the respective relative localization.

According to yet another embodiment, a method may have the steps of: controlling a drive unit to drive a device and to move it along a direction of movement within a plane of movement; controlling an optical sensing unit of the device to sense an object within the or in parallel with the plane of movement so as to obtain a picture of the object; controlling an evaluation unit to evaluate the picture in terms of an at least two-dimensional pattern; and to evaluate the pattern in terms of at least a first marking area and a second marking area, to obtain a marking result by comparing the first marking area and the second marking area; and to determine, on the basis of the marking result, relative localization of the device with regard to the object; controlling a control unit to control the drive unit on the basis of the relative localization.

According to still another embodiment, a non-transitory digital storage medium may have a computer program stored thereon to perform the inventive method, when said computer program is run by a computer.

A core idea of the present invention consists in installing two-dimensional patterns on objects and in determining the relative localization of the device with regard to the object by evaluating the two-dimensional pattern at least in terms of first and second marking areas within the pattern. Consequently, a device which has determined relative localization for itself may control drive means to move said device.

In accordance with an embodiment, a device includes optical sensing means configured to sense an object so as to obtain a picture of the object. The device includes drive means configured to drive and to move the device. The device includes evaluation means configured to evaluate the picture in terms of an at least two-dimensional pattern and to evaluate the pattern in terms of at least a first marking area and a second marking area. The evaluation means configured to obtain a marking result by comparing the first marking area and the second marking area, and to determine, on the basis of the marking result, relative localization of the device with regard to the object. The device further includes control means configured to control the drive means on the basis of the relative localization. This enables relative localization of the device with regard to surrounding objects by means of the recognized patterns and, therefore enables robust and precise control of the drive means.

In accordance with one embodiment, the pattern is a two-dimensional QR (quick response) code which includes a plurality of marking areas between which an object code for identifying the object and a surface code for identifying a surface of the object are arranged along different spatial directions. In addition to localization with regard to the object, this also enables orientation by individual surfaces of the object.

In accordance with an embodiment, the evaluation means is configured to determine a rotation of the object with regard to the device by means of a size comparison of the first marking area and the second marking area. This enables precise determination of the direction with regard to the object so as to move, e.g., perpendicularly or in parallel or at any other angle with regard to the surface.

In accordance with an embodiment, the device is a ground vehicle configured to move along horizontally while using the drive means. The evaluation means is configured to evaluate the pattern in terms of a horizontal arrangement of the first pattern area and of the second pattern area so as to determine a rotation, related to an orientation of the device, of the object about a vertical axis. This enables precise determination of the orientation of the surface with regard to the device.

In accordance with an embodiment, the evaluation means is configured to evaluate the pattern in terms of a vertical arrangement of the first pattern area and of the second pattern area so as to determine a rotation, related to an orientation of the device, of the object about a horizontal axis. This may be advantageous, in particular, when the device and the object may be arranged at different levels of height. Evaluation in terms of rotation of the object about a vertical axis and with regard to a rotation of the object about a horizontal axis may be combined, for example in that at least three marking areas within the two-dimensional pattern are recognized, for example two along a direction comprising at least one horizontal component, and two marking areas arranged along a direction comprising at least one vertical directional component. For example, if diagonal arrangement of the first and second marking areas with regard to the horizontal/vertical direction(s) is provided, it is possible to perform evaluation in terms of both rotations by means of two marking areas.

In accordance with an embodiment, the evaluation means is configured to determine an object distance between the device and the object by means of comparing a size of the first pattern area to a reference size, or of the second pattern area in the picture to the reference size, and to determine the relative localization on the basis of the object distance. Thus, it may also be possible for the distance to be able to be sensed as part of the relative localization via the relative orientation.

In accordance with an embodiment, the evaluation means is configured to evaluate the pattern in terms of a third pattern area and a fourth pattern area which span a rectangle along with the first pattern area and the second pattern area, and to determine the relative localization from deviations of the first to fourth pattern areas from the arrangement as a rectangle. This enables robust relative localization determination since redundant information may possibly also be taken into account.

In accordance with an embodiment, the evaluation means is configured to evaluate the picture in terms of an object code and to perform identification of the object on the basis of the object code, the control means being configured to control the drive means on the basis of the object identification. Object identification may be part of the relative localization in that the device determines its relative position and/or orientation with regard to the object.

In accordance with an embodiment, the evaluation means is configured to evaluate the picture in terms of a surface code and to perform surface identification of a surface of the object on the basis of the surface code, the control means being configured to control the drive means on the basis of the surface identification. This enables the device to orient itself not only with regard to the object but to orient itself also with regard to individual surfaces or sides of the object, so as to avoid specific sides or to move toward them, for example.

In accordance with an embodiment, the evaluation means is configured to evaluate the picture in terms of an object code which is arranged between the first and second marking areas and indicates an identity of the object. This enables synergetic utilization of the marking areas both for determining at least parts of the relative localization and as an orientation aid so as to find additional information.

In accordance with an embodiment, the evaluation means is configured to evaluate the pattern in terms of at least one third marking area, and to evaluate the picture in terms of an object code which is arranged between the first and second marking areas and indicates an identity of the object. The evaluation means is further configured to evaluate the picture in terms of a surface code which is arranged between the third marking area and the first marking area or between the first marking area and the second marking area and indicates an identity of a side of the object on which the pattern is arranged. It may be possible to differentiate different sides of the object from one another by means of the surface code. In addition, synergetic utilization of the marking areas is possible here, too, so as to provide an orientation aid for finding the surface code. In combination with the object code, therefore, it may be possible, by arranging the surface code and the object code between different, previously specified marking areas, to achieve unambiguous identification of the object and of the surface thereof; and the information may be reliably found.

In accordance with an embodiment, the evaluation means is configured to evaluate the pattern in terms of an object code indicating an identity of the object, and to evaluate the pattern in terms of a surface code which is arranged separately from the former and indicates a specific surface region of the object, e.g. a side, and to determine the relative localization with regard to the object and to the surface region. By arranging the surface code and the object code separately, i.e. by spatially separating them, the unambiguity of respective information and/or of a respective code may be supported.

In addition, it is possible, by arranging the codes separately, to represent the respective object code and the respective surface code with few characters, bits or other symbols since each object class, the object in itself and a side thereof, may be encoded for itself.

In accordance with an embodiment, the control means is configured to perform an instruction which indicates to take up a predetermined relative position with regard to a predetermined side of a predetermined object. The control means is configured to adapt its own position by controlling the drive means in accordance with the instruction, on the basis of the localization information. This enables the device to autonomously take up the corresponding relative position with regard to the object.

In accordance with an embodiment, the device comprises coupling means configured to perform mechanical coupling to corresponding mechanical coupling means of the object. Accordingly, a counterpart which is adapted to the coupling means may be understood to mean that it may be implemented as two identical parts, but also as a concept of male and female connectors, a concept similar to a magnetic north pole/south pole or the like. In this manner, it is possible to perform mechanical coupling between the device and the object so as to enable, e.g., transfer of an object and/or to form a combined device which is configured, e.g., to transport shared loads. For example, it may also be connected to other devices or objects, e.g. a charging station or the like.

In accordance with an embodiment, the device is configured to orient itself by the two-dimensional pattern so as to mechanically connect the mechanical coupling means to the corresponding mechanical coupling means. Therefore, the relative localization may be used for aligning the device itself with regard to the corresponding mechanical coupling means of the object, so as to enable the mechanical connection.

In accordance with an embodiment, the device comprises, in a plan view, a polygon surface, advantageously an even-numbered polygon surface, and particularly advantageously in accordance with a regular or irregular octagon. On at least two faces of the polygon, the device comprises mechanical coupling means. This enables highly flexible implementation with regard to the ability to be coupled to other objects. The configuration as a polygon surface is to be understood as an approximation since rounded-off corners or edges may also be understood to be a polygon.

In accordance with an embodiment, the device itself comprises a two-dimensional pattern on at least one side on which the mechanical coupling means is arranged. This enables other devices to accurately move toward the side on which the mechanical coupling means is arranged.

In accordance with an embodiment, a device group includes a plurality of devices described herein. Each of the plurality of devices comprises, on at least one surface, a device pattern, e.g. a described two-dimensional pattern. The device pattern indicates at least an object side or an object identity. The plurality of devices are configured to orient themselves, in relation to one another, on the basis of the respective relative localization.

In accordance with an embodiment, the devices of the plurality of devices are configured to sense the device pattern of other devices and to take up, on the basis of object codes and/or surface codes, a respective relative location with regard to a another device of the device group or to a surface thereof. This enables navigation of the devices as an autonomous swarm.

In accordance with an embodiment, the plurality of devices are configured to mechanically couple to one another, which enables transfer of objects and/or cooperative or combinatorial accomplishment of a transport task.

In accordance with an embodiment, a method by means of which, e.g., devices described herein may be controlled includes controlling drive means so as to drive and to move the device within or in parallel with a plane of movement, e.g. along a direction of movement. The method includes controlling optical sensing means of a device to sense an object within the or in parallel with the plane of movement so as to obtain a picture of the object.

The method includes controlling evaluation means to evaluate the picture in terms of an at least two-dimensional pattern, and to evaluate the pattern in terms of at least a first marking area and a second marking area, to obtain a marking result by comparing the first marking area and the second marking area, and to determine, on the basis of the marking result, relative localization of the device with regard to the object. The method includes controlling control means to control the drive means on the basis of the relative localization.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
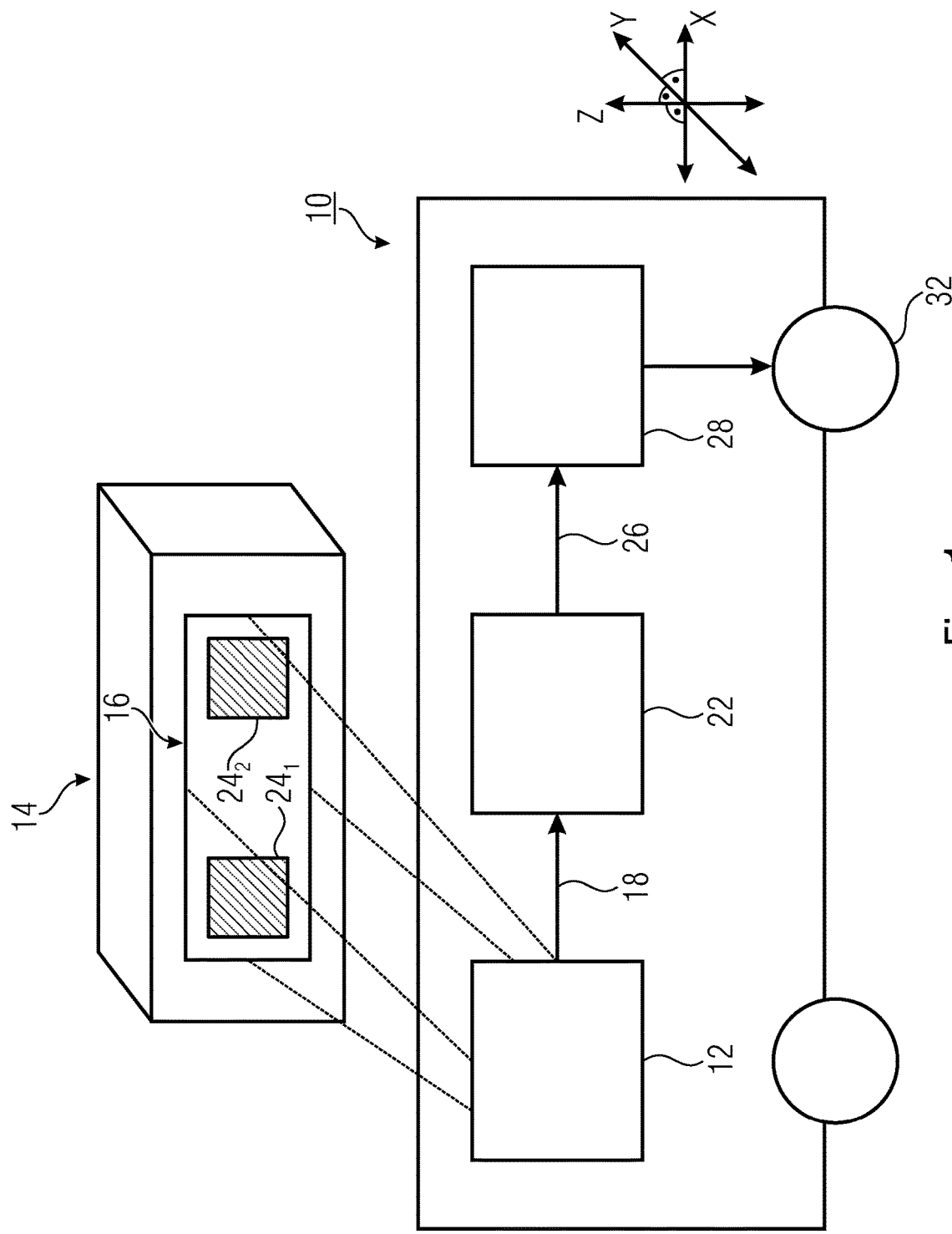
FIG. 1 shows a schematic block diagram of a device in accordance with an embodiment.

Before embodiments of the present invention will be explained in detail with reference to the drawings, it shall be noted that elements, objects and/or structures in the different figures which are identical, identical in function or in effect, are provided with identical reference numerals, so that the descriptions of said elements that are provided in different embodiments are interchangeable and/or mutually applicable.

The present embodiments relate to devices, in particular to self-driving robots. These include, e.g., robots driving autonomously, the term autonomously being understood to mean that e.g. in a device group, e.g. a robot swarm, solutions to specific tasks are developed autonomously. This does not exclude external influences, e.g. overriding communication of a task, e.g. to transport an object or to perform actions at specific locations. Terms such as "self-driving" or "driving autonomously" may be understood to mean that the task of recognizing the surroundings and of orientation as well as of independent locomotion for accomplishing the tasks is achieved.

Even though embodiments described herein relate to driving devices, e.g. while using wheels, rolls or chains, the embodiments are not limited thereto, but relate to any form of one-dimensional, two-dimensional, or three-dimensional locomotion, in particular to flying devices and/or devices where at least one working plane may be varied in position with regard to a direction of height, as is the case with fork-lift trucks, for example.

FIG. 1 shows a schematic block diagram of a device 10 in accordance with an embodiment. The device 10 includes optical sensing means 12 configured to sense an object 14 so as to obtain a picture of the object 14. The optical sensing means 12 may be a line scan camera or an area scan camera, but may alternatively also be configured as a scanner, for example, e.g. as a line scanner. The optical sensing means 12 may obtain the picture of the object 14 while optically scanning it. To this end, imaging on an image sensor may be obtained. Alternatively, however, it is also possible, for example by means of raster scanning along a line, to obtain sequential information regarding the object 14 or parts thereof, which may also include transformation of the object 14, or the part thereof. For example, the optical sensing means 12 may be configured to scan at least a two-dimensional or three-dimensional pattern 16 arranged on the object 14. While this may also be effected, with an area scan camera, by imaging the object 14, e.g. a laser scanner may be preset to corresponding properties of the pattern 16 so that a corresponding output signal 18 of the optical sensing means 12 may be at least partly limited to the properties of the pattern 16.

The device 10 includes drive means 32 configured to drive and to move the device 10. for example, the device 10 may be configured as a ground vehicle so as to move along horizontally, e.g. on a ground area or the like, e.g. within an x/y plane, while using the drive means 32. Alternatively or additionally, at least part of the device 10 may be variable along a z direction, e.g. by means of height adjustment. Alternatively or additionally, the device 10 may be configured to spatially move in a three-dimensional or one-dimensional manner.

In the event of two-dimensional movement, a movement may occur in parallel with the x/y plane; the reference plane may also be curved or titled as a function of the foundation on which the device is moved, e.g. when the ground is uneven. Movement of the device 10 may occur along a variable direction of movement, which may comprise, e.g., an x component and/or a y component. The device may be configured to sense the object 14 along or in parallel with a current or possible direction of movement in addition to the drive means 32, which moves the device along the direction of movement. To this end, the optical sensing means 12 may be configured to sense the object 14 within the x/y plane or in a manner that is offset or tilted with regard thereto. This means that the optical sensing means 12 may sense the object 14 along or in parallel with the direction of movement. The sensed surface of the object 14 is thus arranged to be out of plane with regard to the plane of movement, for example perpendicularly thereto or tilted at an angle thereto that differs from at least 90°, so that sensing of the object 14 enables sensing of the pattern when the line of vision is parallel to the direction of movement. This may be used for recognizing other devices, stations or means with which interaction is desired, and is to be distinguished from ground marks which merely serve to achieve navigation purposes, are arranged perpendicularly to the direction of movement and are assumed to be invariable with regard to the position.

The evaluation means 22 may be configured to evaluate the picture, obtained by means of the output signal 18, in terms of the pattern 16. This means that the pattern 16 may be evaluated in terms of predefined features. For example, the pattern 16 may comprise two or more marking areas $24_1$ and $24_2$. The evaluation means 22 may be configured to evaluate the pattern 16 in terms of at least two marking areas $24_1$ and $24_2$. The evaluation means 22 is further configured to perform a comparison while using the marking areas $24_1$ and $24_2$. The comparison may include mutual comparison of features of the marking areas $24_1$ and $24_2$, but alternatively or additionally may also include a comparison of the respective marking area $24_1$ and/or $24_2$, or of features thereof, with a respective reference quantity. The evaluation means 22 is configured to obtain a marking result on the basis of the comparison. The evaluation means 22 may be configured to determine, on the basis of the marking result, a relative localization of the device 10 with regard to the object 14, in particular to the pattern 16. It is possible, by means of a signal 26, to transmit the relative localization of a control means 28 configured to control a drive means 32. The control means 28 is configured to control the drive means 32 on the basis of the relative localization. The drive means 32 may comprise actuating elements, e.g. wheels, rolls, chains, propellers or the like so as to change the spatial position of the device 10. This means that the device 10 may spatially move on the basis of the recognized pattern 16 and of the evaluation of the pattern features, in particular of the marking areas $24_1$ and $24_2$.

Figure 2A:
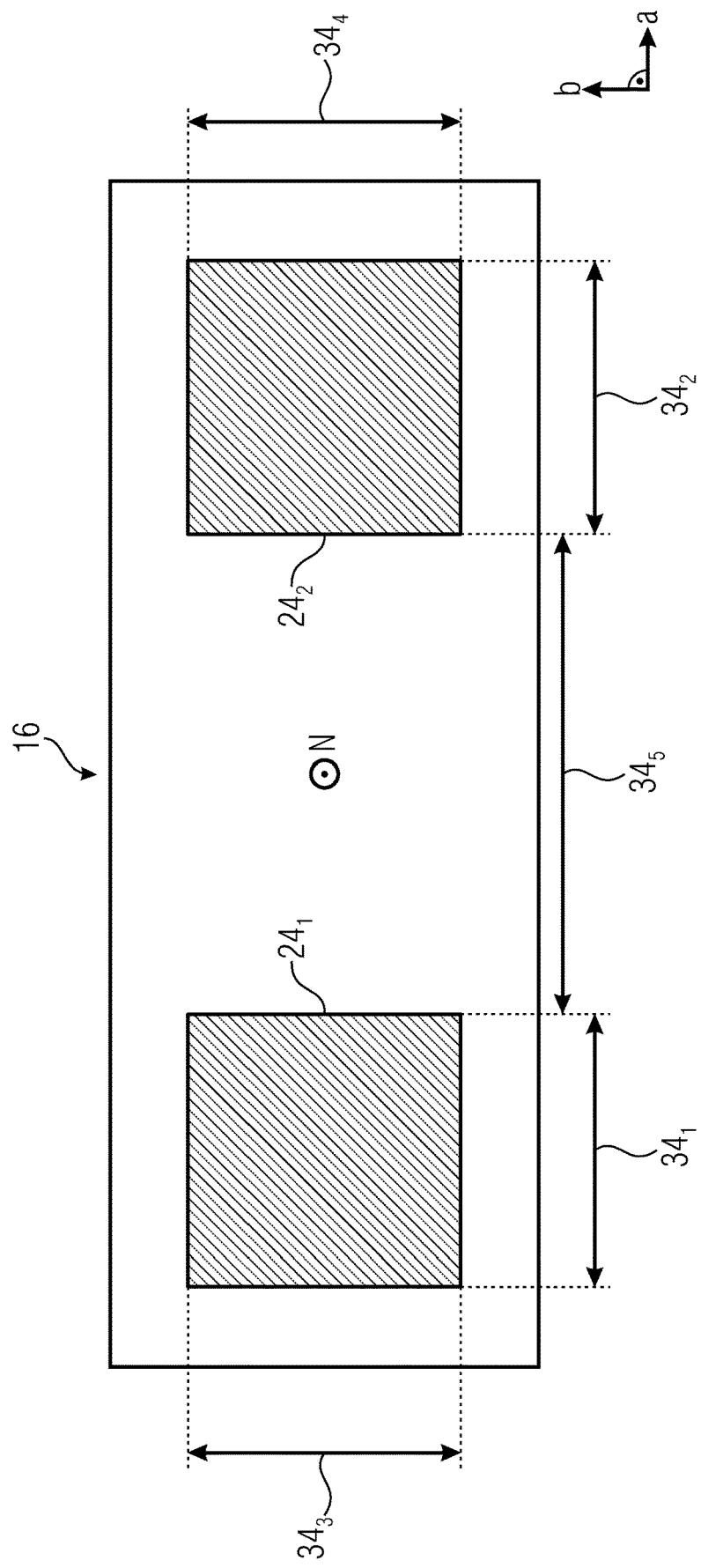
FIG. 2a shows a schematic view of an undistorted pattern in accordance with an embodiment.

FIG. 2a shows a schematic view of the pattern 16, for example in an undistorted state, e.g. when the sensing means 12 views the pattern 16 in a perpendicular manner and/or in parallel with a surface normal N. The marking areas $24_1$ and $24_2$ may comprise properties predefined with regard to a reference quantity. For example, a dimension $34_1$ and $34_2$ of the marking areas $24_1$ and $24_2$ may be identical along a same direction, e.g. along a direction a. Alternatively, the dimension $34_1$ may have a predefined ratio, in relation with the dimension $34_2$, which deviates from a 1:1 ratio, e.g. 1:1.1, 1:1.2, 1:1.3 or any other value; within this context, it may be arbitrary which of the dimensions $34_1$ or $34_2$ is larger and which is smaller. Alternatively or additionally, dimensions $34_3$ and $34_4$, which may be arranged along a direction b, for example, may be identical to or different from each other, at least in a reference state, e.g. in a perpendicular view.

Alternatively or additionally, a dimension $34_5$, e.g. a distance between mutually facing edges of the marking areas $24_1$ and $24_2$, may comprise a predefined value at least at a predefined distance between the sensing means 12 and the pattern 16. The dimension $34_5$ may also refer to other edges of the marking areas $24_1$ and $24_2$.

Even though the marking areas $24_1$ and $24_2$ are depicted as squares, a shape deviating therefrom is also possible, e.g. a free-form surface, a polygon, which is shaped in a regular or irregular manner, an ellipse, in particular a circle, or combinations thereof, e.g. mutually enclosing polygons or ellipses.

In the depicted view of the pattern 16, in which the sensing means 12 views the pattern 16 in a perpendicular manner, for example, the direction a may be aligned, e.g., in parallel with the x direction, and the direction b may be aligned in parallel with the z direction of FIG. 1; such an exemplary implementation is not to limit the present embodiments. For example, the surface normal N may be aligned in parallel with the y direction of FIG. 1.

Figure 2B:
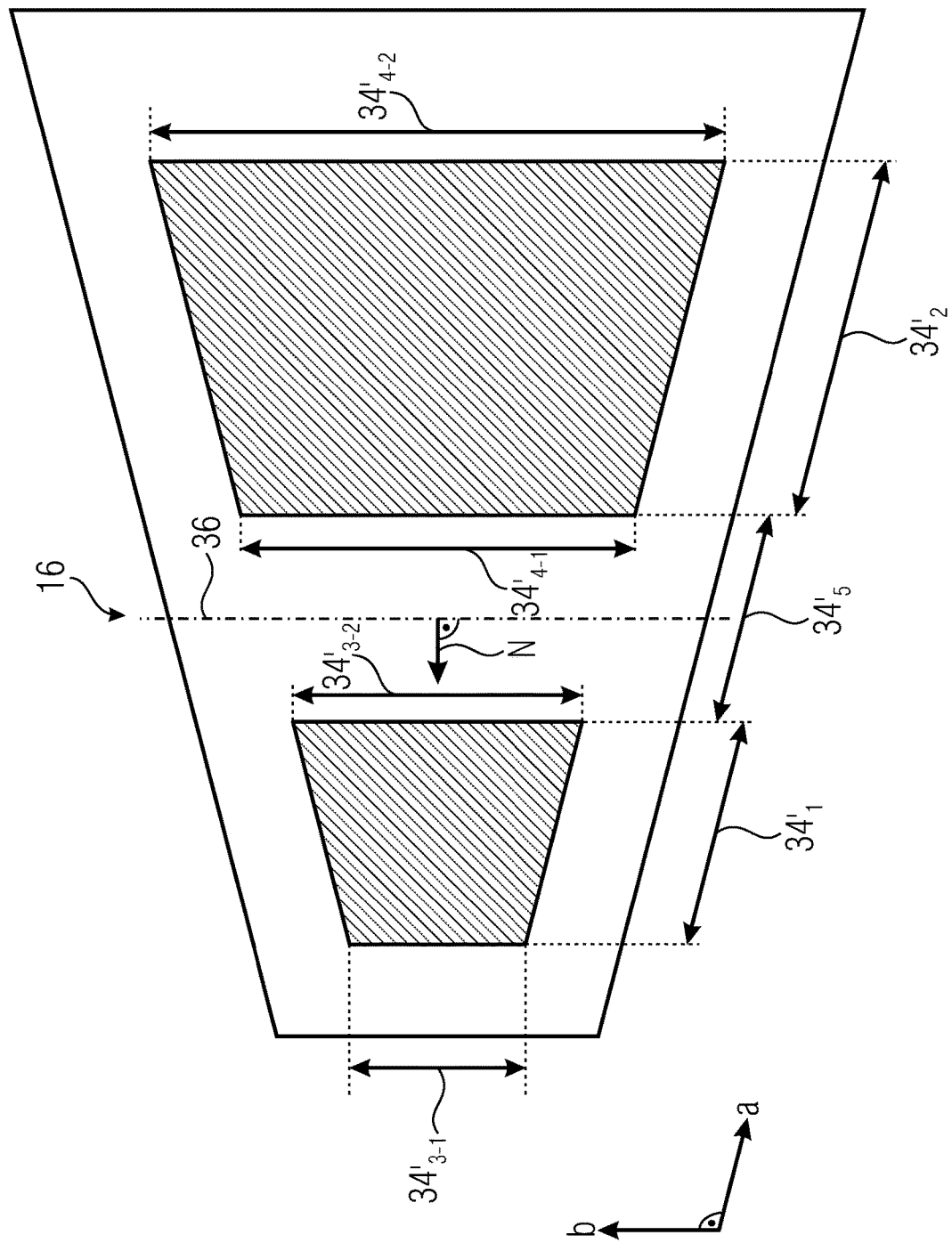
FIG. 2b shows a schematic perspective view of the pattern of FIG. 2a in a perspective view.

FIG. 2b shows a schematic perspective view of the pattern 16 of FIG. 2a. On the basis of the perspective, the surface normal N may deviate from the viewing direction.

As is shown by way of example, distortions may arise within the pattern 16 sensed by the sensing means 12. For example, edges which are otherwise equal in length or are at a certain ratio with one another may be modified, as is depicted, for example, for dimensions $34'_{3-1}$ and $34'_{3-2}$ corresponding to the dimension $34_3$ in the view of FIG. 2a. Alternatively or additionally, dimensions $34'_{4-1}$ and $34'_{4-2}$, which correspond to the dimension $34_4$ in the view of FIG. 2a, may differ from each other. Corresponding deviations which are due to the perspective may also arise between the dimensions $34'_3$ and $34'_4$. In the possibly two-dimensional image obtained from the sensing means 12, the dimensions $34'_1$ and $34'_2$ may consequently also differ both from each other and, irrespectively thereof, from the reference values. The same also applies to a dimension $34'_5$.

This means that on the basis of the perspective, a distortion within the pattern 16 may arise, which may be ascertained by the evaluation means 22, so as to determine the relative localization of the device with regard to the object, in particular to the pattern 16.

A comparison of the dimensions of FIG. 2a or of FIG. 2b with a reference quantity, e.g. a quantity indicating the size of the image on an image senor or the like, may further allow the evaluation means 22 to determine a distance between the device and the object. The relative localization may thus also relate to the object distance, which means that the relative localization may be determined on the basis of the object distance. To this end, the evaluation means 22 may be configured to determine the object distance by means of a comparison of a quantity or dimension within the pattern area $24_1$ and/or $24_2$ within the picture with a reference quantity.

Irrespectively thereof, the evaluation means 22 may be configured to evaluate the pattern 16 in terms of horizontal arrangement of the pattern areas $24_1$ and $24_2$ so as to determine orientation of the device 10 with regard to a rotation of the device 10 with regard to the object 14 about an axis 36. For example, if the device 10 is configured as a ground vehicle, the axis 36 may be vertically aligned, for example in parallel with the b direction or the z direction.

Alternatively or additionally, it is also possible to configure the evaluation means 22 such that same evaluates the pattern 16 in terms of a vertical arrangement of the pattern areas $24_1$ and $24_2$ so as to determine rotation, related to an orientation of the device 10, of the object 14 about a horizontal axis. For example, a difference in dimensions $34'_1$ or $34'_2$ might result at different locations of the pattern due to differences in height, which may be evaluated in an equivalent manner. To this end, the pattern areas $24_1$ and $24_2$ might be arranged along the b direction, for example. Displacement of the pattern areas $24_1$ and $24_2$ along two directions, e.g. along a diagonal, may enable combinatorial evaluation in terms of a rotation of the device with regard to the object about a horizontal axis and a vertical axis.

The embodiments have in common that rotation of the object with regard to the device may be determined by the evaluation means 22 by means of a comparison of the sizes of the marking areas $24_1$ and $24_2$, which conversely and in the sense of relative localization equivalently means rotation of the device with regard to the object.

Figure 3:
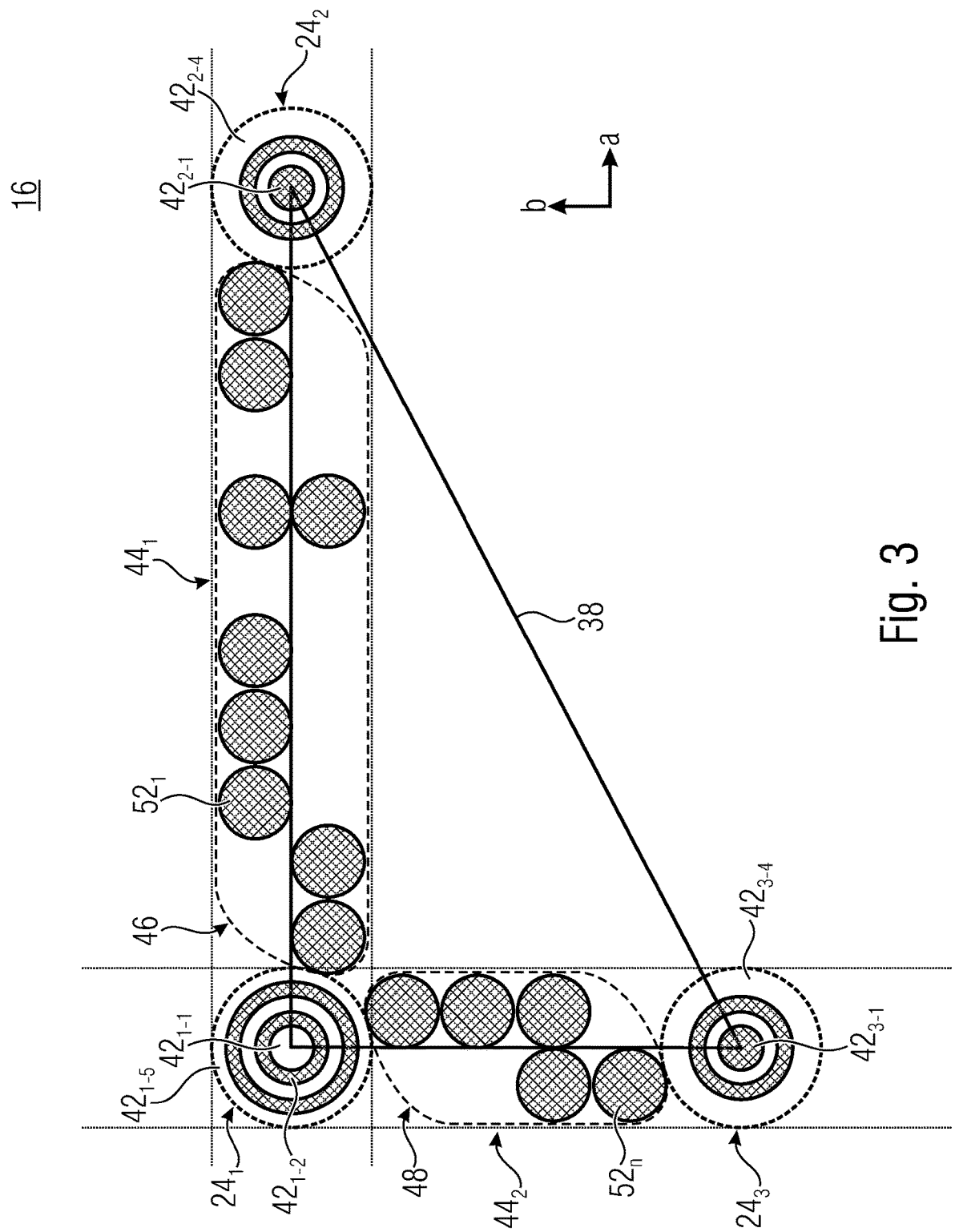
FIG. 3 shows a schematic view of a pattern in accordance with an embodiment that is formed as a two-dimensional QR code having three pattern areas.

FIG. 3 shows a schematic view of a pattern 16 in accordance with an embodiment, which is configured as a two-dimensional QR code. The pattern 16 includes at least two, by way of example three, marking areas $24_1$ and $24_2$ and $24_3$, whose arrangement spans a triangle 38 for the purpose of achieving space efficiency and of accurately determining relative localization. This does not exclude arrangement along a line, but offers advantages with regard to the implementation in combination with additional information, as will be explained below.

The marking areas $24_1$ and $24_2$ and/or $24_3$ may be configured to be identical with or different from one another. By way of example, mutually different numbers of mutually enclosing ring patterns $42_{1-1}$ to $42_{1-5}$, $42_{2-1}$ to $42_{2-4}$, and/or $42_{3-1}$ to $42_{3-4}$ may be arranged in mutually different marking areas $24_1$, and $24_2$, and $24_3$, respectively. For example, outer peripheries of the marking areas $24_1$ to $24_3$ may span, along the directions a and b which may span a pattern-specific coordinate system, pattern areas $44_1$ and $44_2$, which are arranged between two adjacent marking areas $24_1$ and $24_2$, and $24_1$ and $24_3$, respectively. Thus, it is along the different spatial directions a and b that additional information may be depicted in the pattern areas $44_1$ and $44_2$ arranged along said directions, which additional information may be sensed by the sensing means 12 and be evaluated by the evaluation means 22. For example, different information of codes 46 and 48 may be contained; it is also possible, alternatively, to depict only one of the codes 46 or 48. Each of the codes 46 and 48 may contain, independently of each other, specific information which may be evaluable by the evaluation means 22. For example, the code 46 may include an object code for identifying the object 14, which code enables, e.g., to unambiguously identify an object within a specific system or swarm of devices. For example, the code 48 may include a surface code for identifying a specific surface of the object 14. In other words, the valuation means 22 may be configured to evaluate the pattern 16 in terms of the object code 46, which indicates an identity of the object. The evaluation means 22 may further be configured to evaluate the pattern 16 in terms of a surface code 48, which is arranged separately from the object code 46 and which indicates a specific surface region of the object 14, e.g. a side thereof, so as to determine the relative localization with regard to the object 14 and to the surface region. Alternatively or additionally, the codes 46 and 48 may also comprise other information or may be mutually exchanged.

For example, the respective pattern components $52_1$ to $52_n$ formed to be round; however, they may have any other shape, e.g. be formed along a free-form area, a polygon, an ellipse, or the like. The pattern components 52 within a code may be formed to be identical to or different from one another. Likewise, the pattern components in different codes may be formed to be identical to or different from one another.

The evaluation means 22 may be configured to evaluate the picture in terms of the object code 46 and to perform object identification of the object 14 on the basis of the object code 46. The control means 28 may be configured to control the drive means 32 on the basis of the object identification. This means that the object identification may form part of the relative localization. As a result, it is possible for the device 10, for example, to not only determine the presence of any object and/or to determine relative orientation or rotation with regard to the object, but also to identify the object and to distinguish it, e.g., from other objects.

Alternatively or additionally, the evaluation means 22 may be configured to evaluate the picture in terms of the surface code 48, and to perform, on the basis of the surface code 48, surface identification of a surface of the object 14. The control means 28 may be configured to control the drive means 32 on the basis of the surface identification. This enables the device 10 to not only identify and/or to move toward and/or to avoid the object 14, but also to move toward or circumnavigate a specific side or surface of the object 14. For example, the object 14 may be provided, on different sides, with the same object code but with different side codes, which makes it possible to move toward a specific side of the object 14. For example, the device 10 may be informed that a specific side of the object 14 offers the possibility of accommodating or receiving energy, information, or objects, and/or to effect mechanical coupling to the device 10. Driving toward a specific side of the object 14 may thus be relevant to the device 10, which is made possible by the fact that the sides can be distinguished by means of the side code 48.

For example, if patterns in accordance with FIG. 3 are used, the evaluation means may be configured to evaluate the pattern 16 in terms of at least three marking areas $24_1$, $24_2$, and $24_3$ and to evaluate the picture in terms of an object code 46 which is arranged between the marking areas $24_1$ and $24_2$ and indicates an identity of the object 14. Moreover, the evaluation means 22 may be configured to evaluate the picture in terms of a surface code 48 which is arranged between the marking areas $24_1$ to $24_3$ indicates an identity of a side of the object 14 on which the pattern is arranged. Alternatively or additionally, it is also possible for the object code to also be arranged between the marking areas $24_1$ and $24_2$, or for a sequential order of the marking areas $24_1$, $24_2$, and $24_3$ to result in sequential arrangement of the pattern areas $44_1$ and $44_2$ and, consequently, of the codes.

Orientations of directions a and b with regard to the direction x/y/z may be arbitrary within this context. Without any limitations, the pattern 16 may be arranged, for example, on the object 14 and/or may be rotated there. It may also be possible for a spatial relative location of the object 14, for example a rotation about they axis, to be unambiguously determinable from the location of the marking areas $24_1$, $24_2$ and $24_3$.

Figure 4:
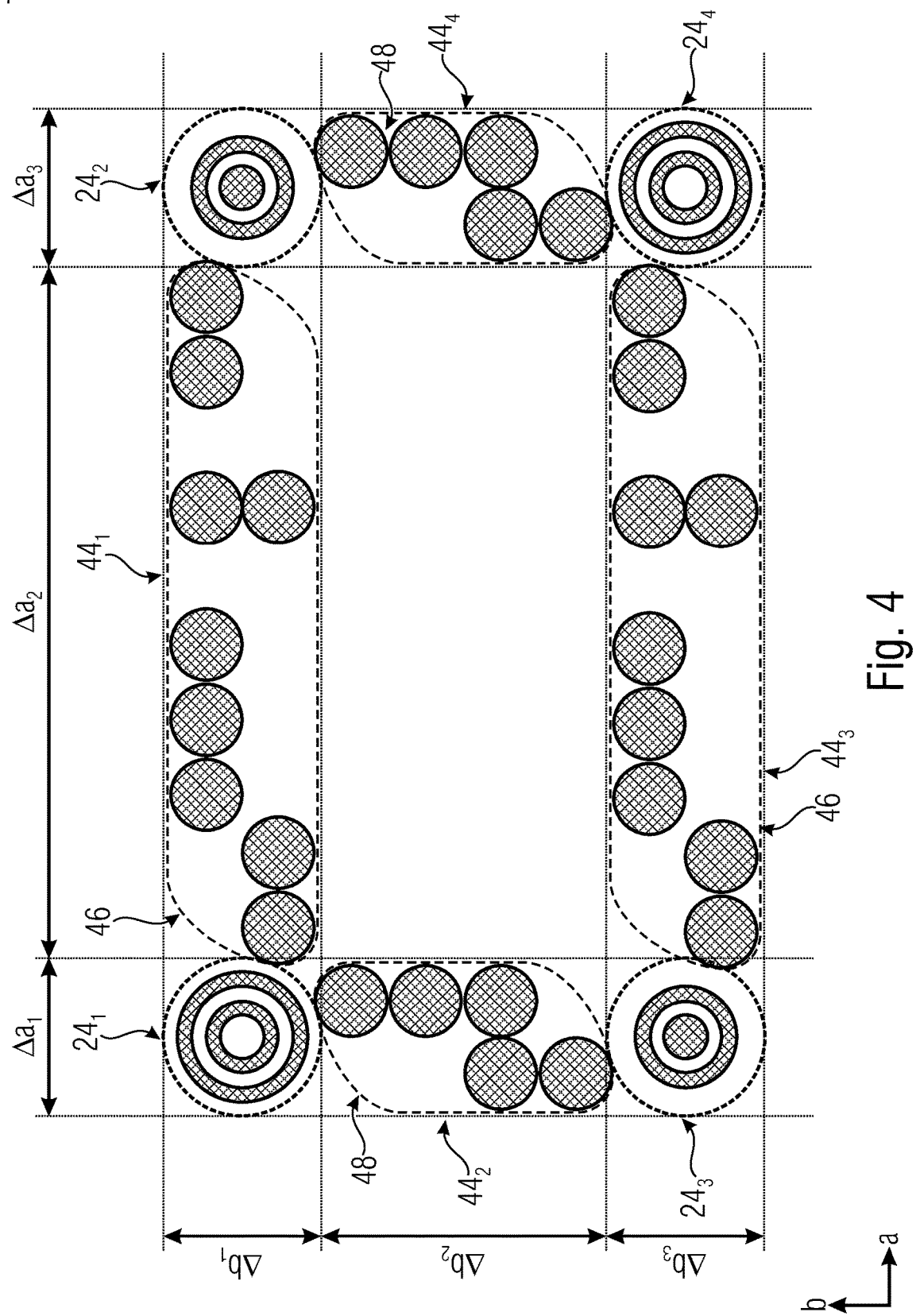
FIG. 4 shows a schematic representation of a pattern in accordance with an embodiment, which comprises at least four pattern areas.

FIG. 4 shows a schematic representation of a pattern 16 in accordance with an embodiment, which comprises at least four pattern areas $24_1$, $24_2$, $24_3$, and $24_4$. For example, the pattern is extended, as compared to the representation shown in FIG. 3, by an additional pattern area, namely pattern area $24_4$. The pattern areas $24_1$ to $24_4$ may span a rectangle. With reference to the explanations given in connection with FIGS. 2a and 2b, a large degree of information may be useful here along both directions a and b so as to determine the relative localization. It is possible to determine both rotation about an axis parallel to the a direction and rotation about an axis parallel to the b direction. While this is also possible in the pattern of FIG. 3, the pattern of FIG. 4 offers additional redundancy. The four edges of the rectangle may define at least one additional pattern area $44_3$ or $44_4$. While the pattern of FIG. 3 may also comprise a pattern area, e.g., at the hypotenuse, depicted there, of the triangle 38, the rectangle configuration of FIG. 4 offers the advantage that the pattern areas $24_1$ and $24_3$ as well as $44_2$ and $44_4$ are mutually comparable.

In mutually oppositely located pattern areas $44_1$ and $44_3$ as well as $44_2$ and $44_4$, redundant information which is identical in each case may be rendered, for example the object code 46, on the one hand, and the side code 48, on the other hand. Other embodiments provide for encoding mutually different information in oppositely located pattern areas $44_1$ and $44_3$, and $44_2$ and $44_4$, respectively. Redundancy enables avoidance of errors, in particular with expected mechanical impairments of the pattern 16.

The evaluation means 22 may be configured to read out the pattern 16 similarly to a QR code. Other patterns in accordance with embodiments described herein provide different encoding, for example as defined by a barcode or other graphic information representations. This includes configuring the evaluation means 22 accordingly.

With renewed reference to FIG. 1, the control means 38 may be configured to perform an instruction indicating to take up a predetermined relative position with regard to a predetermined side of a predetermined object, e.g. of the object 14. The control means 32 is configured to adjust, on the basis of the relative localization with regard to the object 14, its own position by controlling the drive means 32 in accordance with the instruction. For example, an instruction may consist in driving toward the indicated side of the object 14.

The marking areas 44 within which the codes 46 and/or 48 are depicted may be determined in that a displacement of a marking area 24 along one of the directions a or b, specifically toward an adjacent marking area, is observed. Within this context, the marking area 44 may be understood to mean that the surface area within the pattern 16, which is passed over by the displacement along the straight line in parallel with the direction a or b and which is located outside the marking areas 24 at the same time, is available as a pattern area. For example, if a displacement of the marking area $24_1$ along the direction a is observed, the dimension $\Delta b_1$ may determine, in this respect, e.g. a width or dimension along the direction b which is available to the pattern area 44. A length $\Delta a_2$, across which the displacement takes place, may determine a dimension of the pattern area $44_1$ along the direction a. This means that along one direction, an expansion of the pattern area due to the length of the displacement and along a direction perpendicular thereto may be determined by a corresponding dimension of the marking area.

The evaluation means 22 may be configured to verify the picture exclusively within the marking areas $44_1$ to $44_4$ in terms of additional information such as the codes 46 and 48. Within this context, the evaluation means may be configured to verify one, two or more pattern areas 44. Advantageous embodiments relate to axial extensions of the pattern areas 44 along the main directions, which spatially extend in a linearly independent manner, such as the mutually perpendicular directions a and b, which excludes arranging codes on the diagonal of the triangle 38. In accordance with these embodiments, different pattern areas 44 are arranged exclusively perpendicularly or in parallel with one another. This enables clear, fast, and robust localization of codes by means of the marking areas $44_1$ to $44_3$ in FIG. 3, and $24_1$ to $24_4$ in FIG. 4. The pattern areas 44 may have one or more rows or lines arranged therein which comprise encoded information. For example, the pattern area $44_1$ may comprise a number of two lines, where, e.g., 10 columns of a matrix arrangement are arranged. The pattern area $44_2$ may also comprise, e.g., two lines or rows; four columns of a matrix arrangement are disposed. The terms column and row here may be interchanged at random.

Figure 5:
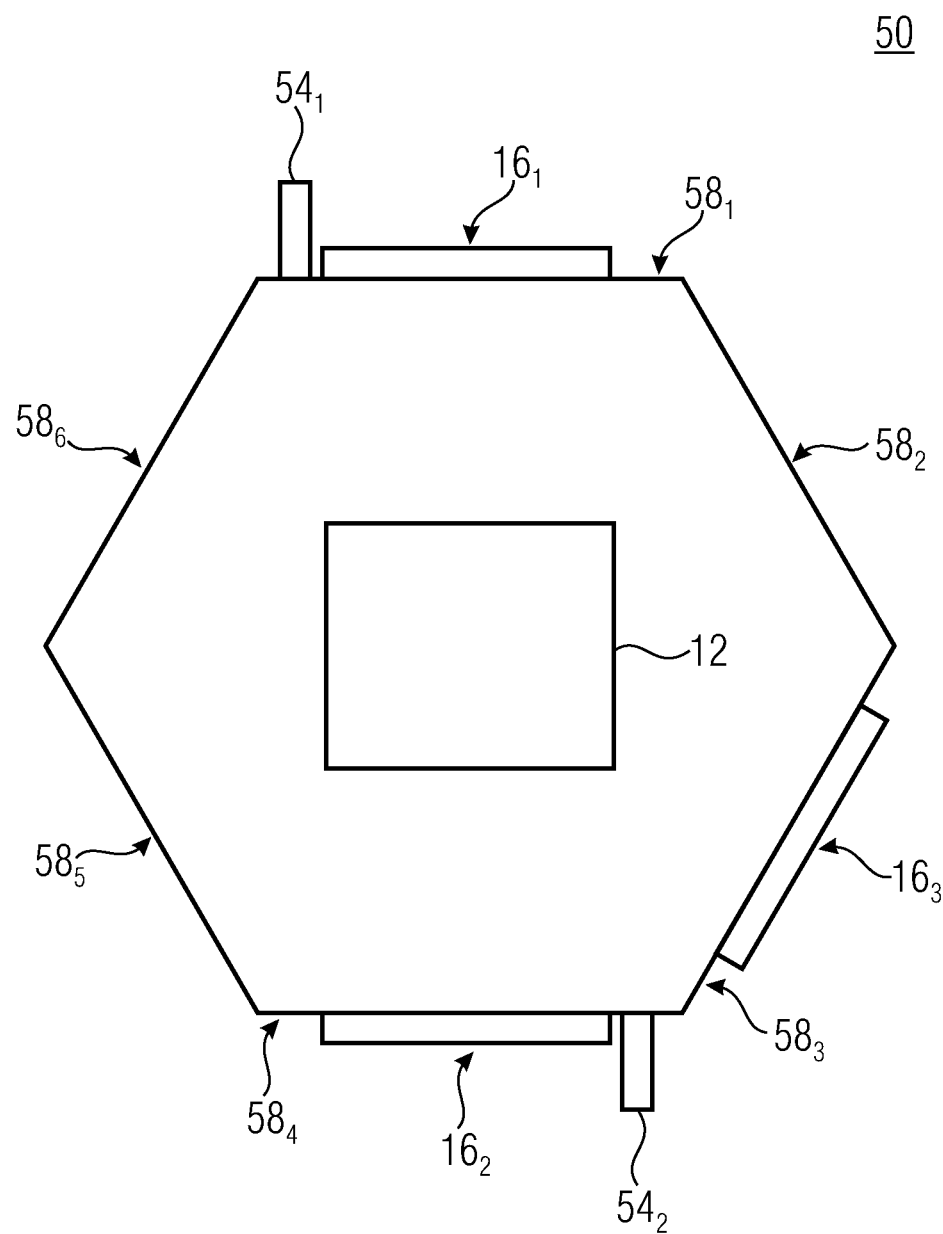
FIG. 5 shows a schematic top view of a device in accordance with an embodiment, which comprises one or more coupling means.

FIG. 5 shows a schematic top view of a device 50 in accordance with an embodiment. The device 50 may comprise one or more coupling means $54_1$ and/or $54_2$. For example, the device 50 may comprise a mechanical, magnetic, electromagnetic, or differently configured force element configured to effect a mechanically fixed connection to a corresponding counterpart and/or to perform a mechanical contact. The coupling means $54_1$ and/or $54_2$ thus is configured to perform mechanical coupling to corresponding mechanical coupling means which may be arranged, e.g., on the object 14.

A pattern $16_1$, $16_2$ and/or $16_3$ may be arranged on one or several or all sides of the device 50. The patterns may be completely or partly identical, e.g. while using a pattern of FIG. 1, 2a, or 2b. Alternatively, the pattern may be object-specific, which also enables identical patterns $16_1$, $16_2$ and $16_3$; however, the pattern may differ from other devices, for example within a device group or swarm. Alternatively or additionally, however, embodiments provide for the patterns $16_1$, $16_2$ and $16_3$ to be at least individual in terms of sides, which means that different sides $58_1$, $58_3$, and $58_4$ comprise mutually different patterns $16_1$, $16_2$ and $16_3$, so that the sides may be distinguished from one another by means of the patterns $16_1$ to $16_3$.

The device 50 may be configured such that a side-individual pattern is attached on at least one, several or all sides 58. Attachment may be effected by means of adhesion or a bonding agent, but may also be effected integrally with a sidewall, for example by means of engraving or some other lithography technique.

The device 50 may be configured to orient itself by a corresponding two-dimensional pattern attached on the object 14, e.g. on a different device. While using the mechanical coupling means $54_1$ or $54_2$, the device 50 may establish a mechanical connection to the corresponding mechanical coupling means.

For high flexibility of the mechanical connection, it may be advantageous to configure the device 50 such that a base body of the device 50 spans a polygon surface. The polygon surface may comprise at least three sides and may be formed to be regular or irregular, advantageously in a manner which enables achieving high area density when connecting it to several devices. For example, regular hexagons or regular octagons are suitable for this purpose. It is advantageous for the device 50 to comprise a mechanical coupling means on at least two possibly oppositely located surfaces.

Implementation of the base body as a polygon surface does not prevent that elements such as wheels of the drive means, the mechanical coupling means or the like will jut out from one or more sides. However, this is advantageously implemented such that the mechanical coupling may be effected such that no blockage or hindrance is caused by said elements.

In accordance with embodiments, the device comprises a pattern 16 at least on one side on which the mechanical coupling means $54_1$ or $54_2$ is arranged. This enables other devices to find sides of the device 50 which are designed for mechanical coupling.

Even though FIG. 5 is depicted such that the mechanical coupling means $54_1$ is located adjacently to the pattern $16_1$ and that the mechanical coupling means $54_2$ is located adjacently to the pattern $16_2$, any other implementations are possible, such as a position above or below, laterally adjacent and/or mutually enclosing. For example, the mechanical coupling means 54 may also be arranged in an intermediate area or central area of the pattern 16. This enables precise localization of the mechanical coupling means by means of the pattern.

Figure 6:
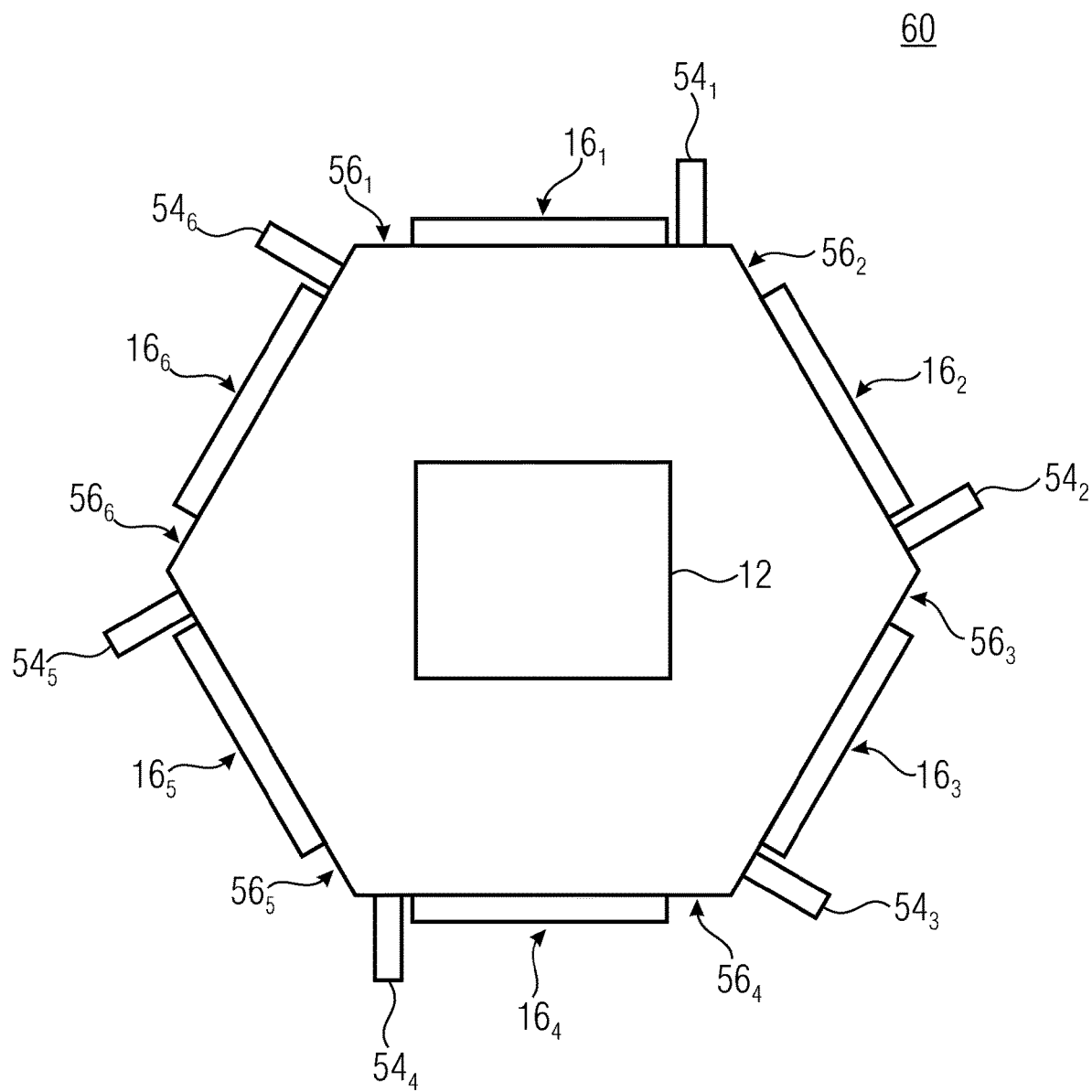
FIG. 6 shows a schematic top view of a device in accordance with an embodiment, wherein each of the exemplarily six sides is provided with a side-individual pattern.

FIG. 6 shows a schematic top view of a device 60 in accordance with an embodiment, wherein each of the exemplarily six sides $56_1$ to $56_6$ is provided with a side-individual pattern $16_1$ to $16_6$; by way of example, each side $56_1$ to $56_6$ comprises mechanical coupling means $54_1$ to $54_6$. A number of patterns, sides and/or sides provided with a pattern and/or with a coupling means may be varied at random.

Figure 7:
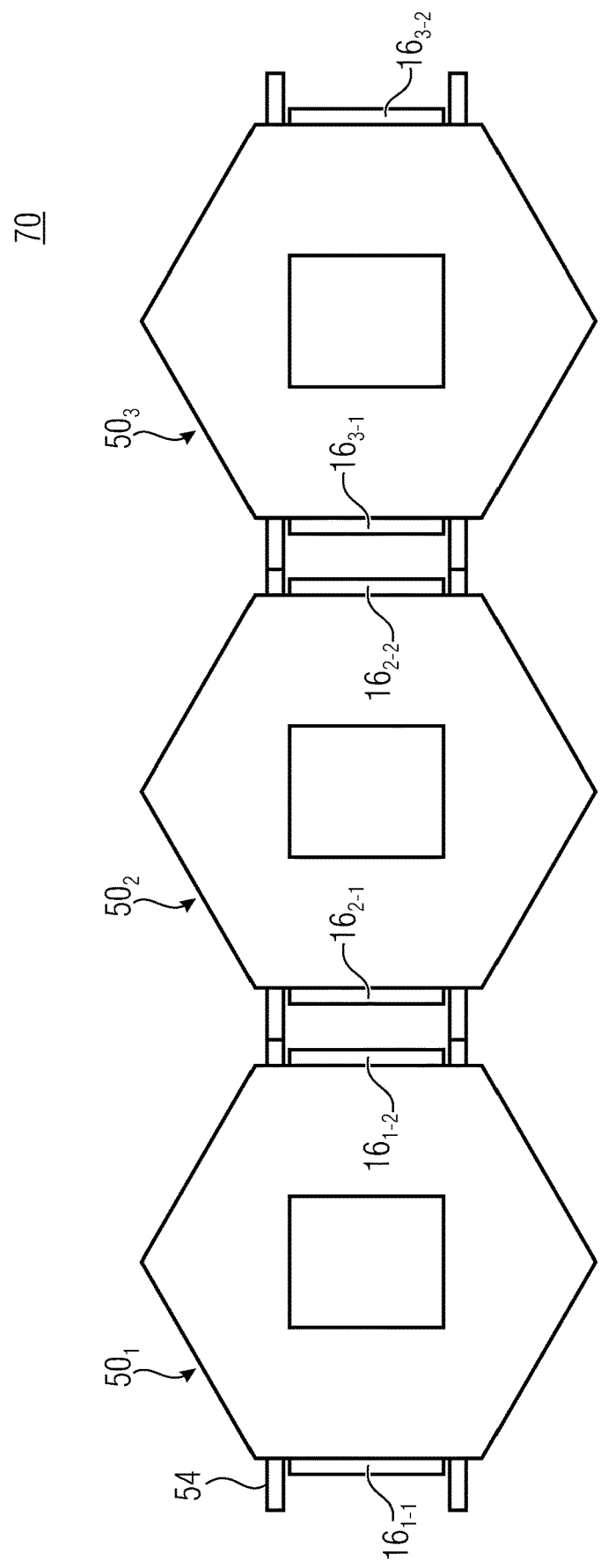
FIG. 7 shows a schematic top view of a device group in accordance with an embodiment, wherein devices are coupled in a one-dimensional manner.

FIG. 7 shows a schematic top view of a device group 70 in accordance with an embodiment. The device group 70 includes at least two, at least three, at least four, or a higher number, e.g. at least 10, at least 20, or more devices, such as devices 50, as is depicted by way of example by designations $50_1$, $50_2$, and $50_3$. Alternatively or additionally, other devices described herein may also be part of the device group, for example the device 10 or the device 70. A number of the respective devices may be arbitrary here.

For example, if the device 10 is used once or several times in the device group 70, it may be extended by arranging a corresponding pattern, or device pattern, so as to give other devices the opportunity to orient themselves by the corresponding device. In this manner, one may achieve that the plurality of devices $50_1$ to $50_3$ each comprise, on at least one surface, a device pattern indicating at least an object side or an object identity. The plurality of devices may be configured to orient themselves, in relation to one another, on the basis of the respective individually determined relative localization.

Embodiments provide for the devices to be configured to sense the device pattern located on the device and to take up, on the basis of the object code and/or surface code, a relative location with regard to another device of the device group or to a surface thereof.

Optionally, and as is shown for the device group 70, two or more, for example three or all of the devices may be mechanically coupled to one another, for example while using mechanical coupling means 54.

Figure 8:
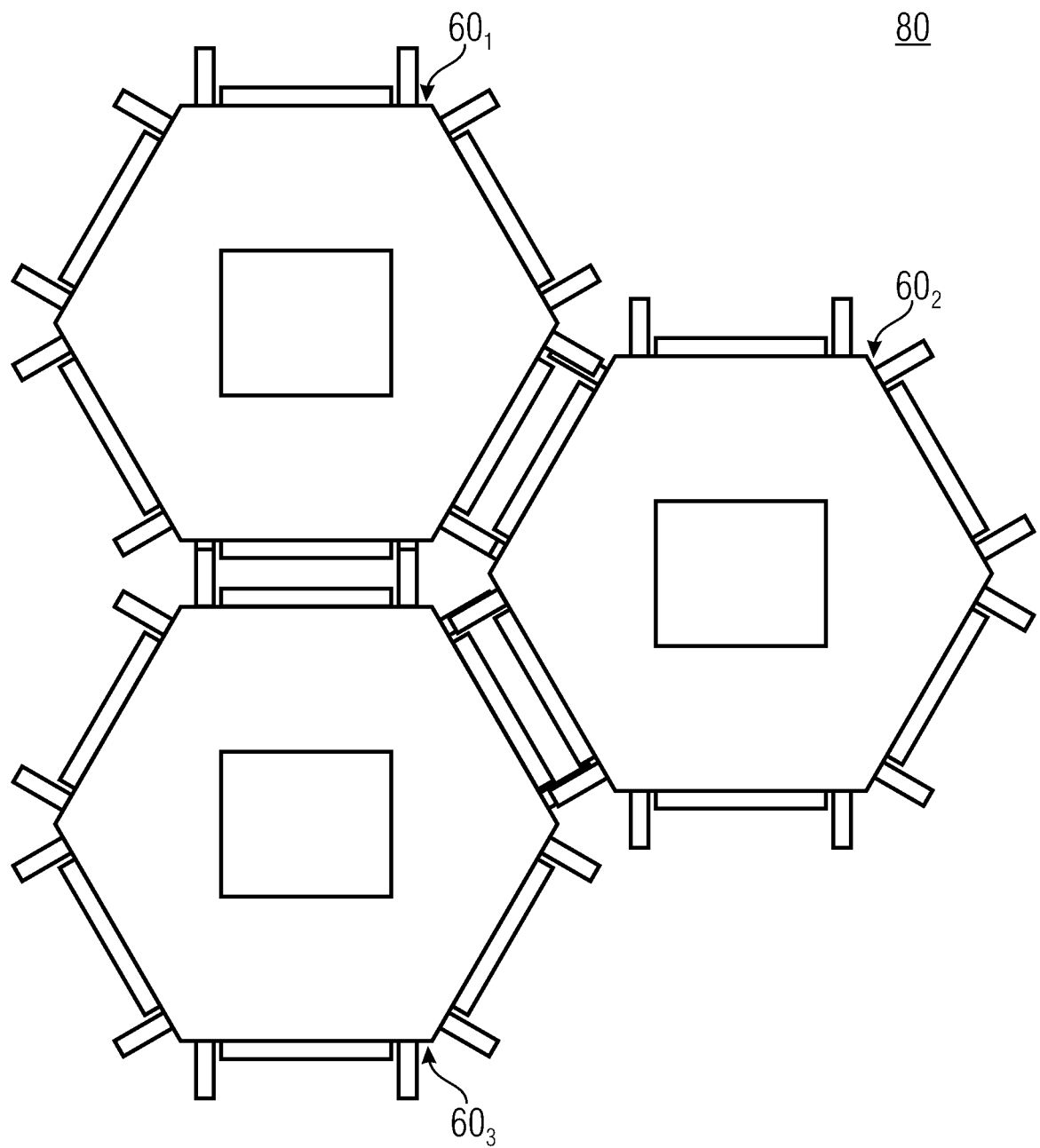
FIG. 8 shows a schematic top view of a device group in accordance with an embodiment, which also comprises a plurality of two-dimensionally coupled devices.

FIG. 8 shows a schematic top view of a device group 80 in accordance with an embodiment, which also comprises a plurality of devices, e.g. devices $60_1$ to $60_3$, which may each be configured as a device 60. By arranging mechanical coupling means along different directions, it is possible to obtain two-dimensional coupling—unlike FIG. 7, where mechanical coupling takes place along one single direction.

Embodiments provide for the possibility to arrange mechanical coupling means along three spatial directions so as to form a three-dimensional group.

Figure 9:
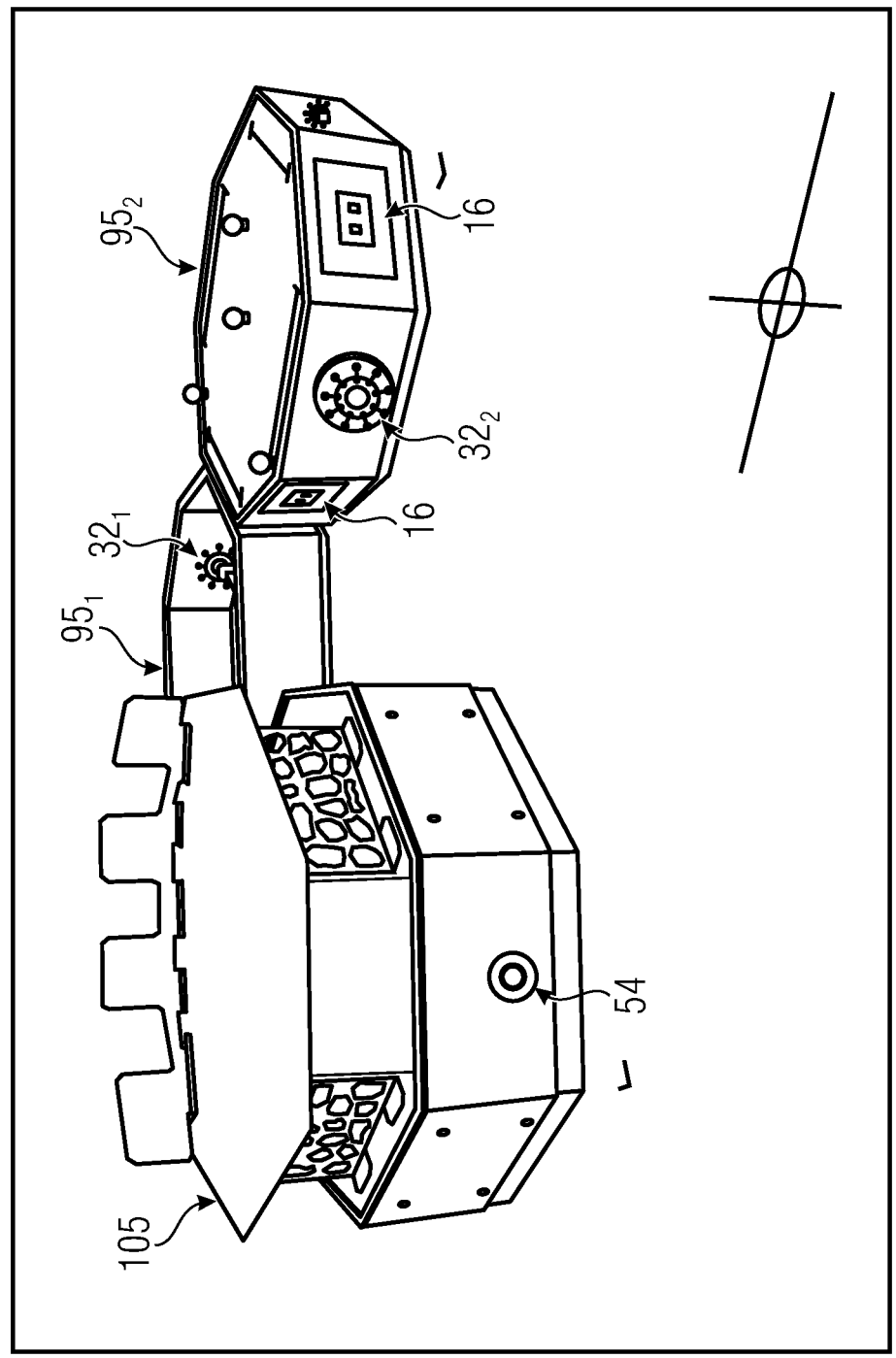
FIG. 9 shows an exemplary perspective photograph of a device group in accordance within embodiment.

FIG. 9 shows an exemplary perspective photograph of a device group 90 in accordance with an embodiment. The device group 90 includes, e.g., devices $95_1$ and $95_2$, which are depicted in a mechanically coupled state. The devices $95_1$ and $95_2$ may be formed, e.g., to comply with the explanations given on devices 10, 50, and/or 60. By way of example, the devices $95_1$ and/or $95_2$ may comprise, in a top view, an octagon shape of a base body.

One or more sides of a device $95_1$ and/or $95_2$ may be provided with the patterns 16, which may optionally comprise object codes and/or surface codes, or side codes.

A further device 105 of the device group 90 may be mobile or immobile, and comprises, e.g., coupling means 54. The device 105 may be configured to exchange objects with devices $95_1$ and/or $95_2$, and/or to exchange information or energy, for example by means of the coupling means 54.

In other words, FIG. 9 shows a prototype of an embodiment. Parts of the side panels may have inventive encoding for recognizing the devices attached thereto. For example, patterns in accordance with FIG. 2a, 2b, 3, or 4 may be used.

While FIG. 3 shows a non-redundant variant having a horizontal code and a vertical code, FIG. 4 shows an implementation having two horizontal codes and two vertical codes. It is to be noted that one single code is arranged merely between two markers, which is depicted, by way of example, by the open-circle patterns in the corners, which form a marking area, or a marker. Embodiments are presented such that at one point, a horizontal code is used, and at another point, a vertical code is used, which in principle is arbitrary. A longer side may be used for recognizing participants, for example, since the number of participants is possibly larger than the number of sides of an object and therefore, more space is possibly available for encoding more information. A vertical direction may be used, e.g. in FIG. 3 or 4 for recognizing the side number in the vehicles, e.g., 1 to 6 or 1 to 8. Recognition of the spatial position (or, rather, of the distance from oneself) and/or of the orientation of the face having the code may even be achieved when only the two markers of a horizontal code are evaluated. With horizontal markers/codes, the rotation of the other participant about the vertical axis may be measured, which may be of interest for ground vehicles. With vertical markers/codes, the rotation about the horizontal axis may be measured. The distance may be calculated via the sizes of the markers in the captured image.

In yet other words, outer surfaces of the vehicles have codes in the form of bit patterns attached thereto, which on the one hand assign an unambiguous identification (ID) to each vehicle, which may be identical from all sides and faces. On the other hand, each face of the vehicle obtains an unambiguous ID, which may be recognized separately from the vehicle ID and may be identical across all vehicles, so that, e.g., same sides of different vehicles may be encoded in the same manner. As a result of this separation, e.g., a "side 1" of all vehicles may obtain the same bit sequence in each case since the assignment stating to which vehicle the observed face belongs may be determined via the bit sequence of the vehicle ID. Alternatively or additionally, other entities with which the vehicle may interact may be made accessible in accordance with the same principle. For example, a reception or delivery station may be provided with a code, whereby said station may then be automatically recognized, or identified.

The encoded bit sequences may be arranged in lines or two-dimensional areas and be attached between two "markers", marking areas 24. For example, FIGS. 3 and 4 show utilization of two bit lines, respectively, in mutually different numbers of columns; the codes may be turned toward each other, e.g. by 90°. The designation of lines, rows or columns serves to further understanding, but may be interchanged at random. Markers may be simple, readily recognizable and robust features, i.e. properties which primarily serve to recognize the position of the code within the image, similarly to the markers in QR codes. The size ratio and the positions of two adjacent markers may be used for determining the positions of the bits between the markers. Within this context, one or more bit lines may be located between the markers, which means n bit lines, wherein n≥1. It is possible to attach at least two, but also more markers per surface area. An optimum may result at a number of four, for example. Consequently, one may possibly achieve an optimum ratio of markers to bit lines (pattern areas), for example by using a number of four×n bit lines for four markers. The diagonals may be used, but embodiments provide for dispensing therewith. Moreover, the additional information about the alignment of the face may be used for improving calculation of the bit position. Via channel coding (e.g. Reed Solomon), error protection may be introduced so as to correct erroneously read bits. Markers that have once been detected may be tracked within the image, e.g. by means of consecutive sensing of the object. To this end, a Kalman filter may be used, for example. This enables avoiding having to search for markers in the entire image each time in the event of two successive time steps.

Embodiments enable simple and robust recognition of mutual orientations of vehicles. Separation between vehicle ID and side ID in combination with the fact that information is encoded only in the area located between two markers enables robust recognition even in the event of partial concealment of the face on which the code is attached. As soon as two markers are recognized, the information between them can be read out. Consequently, the vehicle ID may still be determined even if part of the code for the face ID is concealed. By accommodating the bits between the marker, it is not necessary to transform the entire image area spanned by the markers, as is the case with QR codes, for example. It may be sufficient to apply the transformation to a line, or a straight line, within the image, which is many times easier and faster. Since by means of the code, it is not only possible to provide information about the alignment of another participant, but also to estimate the distance from the latter, the method may be used for achieving localization of other participants with regard to one's own positon. With QR codes (and codes which work similarly), part of the existing bits is used for enabling and validating the useful image transformation of the code ("synchronization line"), another part is used for representing the type of the QR code (number of bits used, etc.). Embodiments are not dependent on this since the code is specifically tailored to the field of application of said devices.

Embodiments enable robust and fast recognition of participants or objects with mobile robots which have cameras. Such embodiments are of interest, in particular, for mobile robots at stations in intralogistics so as to obtain, in a pick-up or transfer operation, in addition to information about the mere position, information about the respective alignments of the other participants with regard to one's own alignment.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable. Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer. The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer. A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU) or a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Device comprising:
an optical sensing unit configured to sense an object so as to acquire a picture of the object;
a drive unit configured to drive and to move the device;
an evaluation unit configured to evaluate the picture in terms of an at least two-dimensional pattern, and to evaluate the pattern in terms of at least a first marking area and a second marking area so as to acquire a marking result by comparing the first marking area and the second marking area; and to determine, on the basis of the marking result, relative localization of the device with regard to the object;
a control unit configured to control the drive unit on the basis of the relative localization;
wherein the drive unit is configured to move the device along a direction of movement; wherein the optical sensing unit is configured to sense the object along or in parallel with the direction of movement;
wherein the evaluation unit is configured to evaluate the picture in terms of an object code and to perform object identification of the object on the basis of the object code, the control unit being configured to control the drive unit on the basis of the object identification; and
wherein the evaluation unit is configured to evaluate the picture in terms of a surface code and to perform surface identification of a surface of the object on the basis of the surface code, the control unit being configured to control the drive unit on the basis of the surface identification;
wherein the device is adapted to distinguish the object from other objects carrying different object codes and to distinguish, based on the surface code, the surface of the object from other surfaces carrying different surface codes and a same object code, wherein based on the pattern, the device is adapted to identify the object, to identify the surface of the object and to determine a rotation, related to an orientation of the device, of the object about a vertical axis and/or about a horizontal axis.

2. Device as claimed in claim 1, wherein the pattern is a two-dimensional QR code which comprises a plurality of marking areas between which an object code for identifying the object and a surface code for identifying a surface of the object are arranged along different spatial directions.

3. Device as claimed in claim 1, wherein the evaluation unit is configured to determine a rotation of the object with regard to the device by means of a size comparison of the first marking area and the second marking area.

4. Device as claimed in claim 3, the device being a ground vehicle configured to move along horizontally while using the drive unit, the evaluation unit being configured to evaluate the pattern in terms of a horizontal arrangement of the first pattern area and of the second pattern area so as to determine a rotation, related to an orientation of the device, of the object about a vertical axis.

5. Device as claimed in claim 3, wherein the evaluation unit is configured to evaluate the pattern in terms of a vertical arrangement of the first pattern area and of the second pattern area so as to determine a rotation, related to an orientation of the device, of the object about a horizontal axis.

6. Device as claimed in claim 1, wherein the evaluation unit is configured to verify exclusively areas of the picture in terms of the presence of additional information, the evaluation unit being configured to verify the picture in at least a pattern area; wherein pattern areas are spanned along a linear straight-line displacement of a marking area to form an adjacent marking area.

7. Device as claimed in claim 6, wherein an expansion of the pattern area along a direction perpendicular to the straight line is determined by a dimension of the marking area.

8. Device as claimed in claim 6, wherein different pattern areas extend exclusively perpendicularly or in parallel with one another.

9. Device as claimed in claim 1, wherein the evaluation unit is configured to determine an object distance between the device and the object by means of comparing a size of the first or second pattern areas in the picture to a reference size, and to determine the relative localization on the basis of the object distance.

10. Device as claimed in claim 1, wherein the evaluation unit is configured to evaluate the pattern in terms of a third pattern area and a fourth pattern area which span a rectangle along with the first pattern area and the second pattern area, and to determine the relative localization from deviations of the first to fourth pattern areas from the arrangement as a rectangle.

11. Device as claimed in claim 1, wherein the evaluation unit is configured to evaluate the picture in terms of an object code and to perform object identification of the object on the basis of the object code, the control unit being configured to control the drive unit on the basis of the object identification.

12. Device as claimed in claim 1, wherein the evaluation unit is configured to evaluate the picture in terms of a surface code and to perform surface identification of a surface of the object on the basis of the surface code, the control unit being configured to control the drive unit on the basis of the surface identification.

13. Device as claimed in claim 1, wherein the evaluation unit is configured to evaluate the picture in terms of an object code which is arranged between the first and second marking areas and indicates an identity of the object.

14. Device as claimed in claim 1, wherein the evaluation unit is configured to evaluate the pattern in terms of at least one third marking area; and
to evaluate the picture in terms of an object code which is arranged between the first and second marking areas and indicates an identity of the object; and
to evaluate the picture in terms of a surface code which is arranged between the third marking area and the first or second marking areas and indicates an identity of a side of the object on which the pattern is arranged.

15. Device as claimed in claim 1, wherein the evaluation unit is configured to evaluate the pattern in terms of an object code indicating an identity of the object, and to evaluate the pattern in terms of a surface code which is arranged separately from the former and indicates a specific surface region of the object, and to determine the relative localization with regard to the object and to the surface region.

16. Device as claimed in claim 1, wherein the control unit is configured to perform an instruction which indicates to take up a predetermined relative position with regard to a predetermined side of a predetermined object, and is configured to adapt its own position by controlling the drive unit in accordance with the instruction, on the basis of the relative localization.

17. Device as claimed in claim 1, comprising a coupling unit configured to perform mechanical coupling to a corresponding mechanical coupling unit of the object.

18. Device as claimed in claim 17, configured to orient itself by the two-dimensional pattern so as to mechanically connect the mechanical coupling unit to the corresponding mechanical coupling unit.

19. Device as claimed in claim 17, comprising a two-dimensional pattern on at least one side on which the mechanical coupling unit is arranged.

20. Device as claimed in claim 1, which in a top view spans a polygon surface and comprises a mechanical coupling unit on at least two faces of the polygon.

21. Device as claimed in claim 1, which is a self-driving robot.

22. The device of claim 1, being a robot, wherein the object is another robot; wherein the device is to mechanically couple to the other robot based on the marking result obtained by evaluating the pattern in terms of at least the first marking area and the second marking area;
wherein the device is configured for distinguishing between different objects carrying different object codes and to distinguish between different surfaces of an object, the different surfaces carrying a same object code and different surface codes;
wherein the device is to mechanically couple to the other robot at a side thereof carrying the pattern based on evaluation of the pattern.

23. The device of claim 1,
wherein the device is to mechanically couple to the other robot at a side thereof carrying the pattern based on evaluation of the pattern.

24. The device of claim 1, being a robot, wherein the object is another robot;
wherein the evaluation unit is configured to evaluate the picture in terms of an object code and to perform object identification of the object on the basis of the object code, the control unit being configured to control the drive unit on the basis of the object identification;
wherein the evaluation unit is configured to evaluate the picture in terms of a surface code and to perform surface identification of a surface of the object on the basis of the surface code, the control unit being configured to control the drive unit on the basis of the surface identification; wherein the device is configured for distinguishing between different objects carrying different object codes and to distinguish between different surfaces of an object, the different surfaces carrying a same object code and different surface codes;
wherein the device is to mechanically couple to the other robot based on the object code and based on the surface code.

25. Device group comprising:
a plurality of devices comprising:
an optical sensing unit configured to sense an object so as to acquire a picture of the object;
a drive unit configured to drive and to move the device;
an evaluation unit configured to evaluate the picture in terms of an at least two-dimensional pattern, and to evaluate the pattern in terms of at least a first marking area and a second marking area so as to acquire a marking result by comparing the first marking area and the second marking area; and to determine, on the basis of the marking result, relative localization of the device with regard to the object;
a control unit configured to control the drive unit on the basis of the relative localization;
wherein the drive unit is configured to move the device along a direction of movement; wherein the optical sensing unit is configured to sense the object along or in parallel with the direction of movement;
wherein the evaluation unit is configured to evaluate the picture in terms of an object code and to perform object identification of the object on the basis of the object code, the control unit being configured to control the drive unit on the basis of the object identification; and
wherein the evaluation unit is configured to evaluate the picture in terms of a surface code and to perform surface identification of a surface of the object on the basis of the surface code, the control unit being configured to control the drive unit on the basis of the surface identification;
wherein the device is adapted to distinguish the object from other objects carrying different object codes and to distinguish, based on the surface code, the surface of the object from other surfaces carrying different surface codes and a same object code, wherein based on the pattern, the device is adapted to identify the object, to identify the surface of the object and to determine a rotation, related to an orientation of the device, of the object about a vertical axis and/or about a horizontal axis;
wherein the plurality of devices comprise, on at least one surface, a device pattern indicating at least one object side or an object identity;
wherein the plurality of devices are configured to orient themselves, in relation to one another, on the basis of the respective relative localization.

26. Device group as claimed in claim 25, wherein the devices are configured to sense the device pattern of other devices; and to take up, on the basis of object codes and/or surface codes, a respective relative location with regard to another device of the device group or to a surface thereof.

27. Device group as claimed in claim 25, wherein the plurality of devices are configured to mechanically couple to one another.

28. Method comprising:
controlling a drive unit to drive a device and to move it along a direction of movement within a plane of movement;
controlling an optical sensing unit of the device to sense an object within the or in parallel with the plane of movement so as to acquire a picture of the object;
controlling an evaluation unit to evaluate the picture in terms of an at least two-dimensional pattern; and to evaluate the pattern in terms of at least a first marking area and a second marking area, to acquire a marking result by comparing the first marking area and the second marking area; and to determine, on the basis of the marking result, relative localization of the device with regard to the object; such that the picture is evaluated in terms of an object code and object identification of the object is performed on the basis of the object code, the drive unit controlled on the basis of the object identification; and such that the picture is evaluated in terms of a surface code and surface identification of a surface of the object is performed on the basis of the surface code, the drive unit being controlled on the basis of the surface identification;

such that the object is distinguished from other objects carrying different object codes based on the surface code, the surface of the object is distinguished from other surfaces carrying different surface codes and a same object code, such that based on the pattern, the object and the surface of the object are identified a rotation, related to an orientation of the device, of the object about a vertical axis and/or about a horizontal axis is determined;

controlling a control unit to control the drive unit on the basis of the relative localization.

29. A non-transitory digital storage medium having a computer program stored thereon to perform the method which comprises:

controlling a drive unit to drive a device and to move it along a direction of movement within a plane of movement;

controlling an optical sensing unit of the device to sense an object within the or in parallel with the plane of movement so as to acquire a picture of the object;

controlling an evaluation unit to evaluate the picture in terms of an at least two-dimensional pattern; and to evaluate the pattern in terms of at least a first marking area and a second marking area, to acquire a marking result by comparing the first marking area and the second marking area; and to determine, on the basis of the marking result, relative localization of the device with regard to the object; such that the picture is evaluated in terms of an object code and object identification of the object is performed on the basis of the object code, the drive unit controlled on the basis of the object identification; and such that the picture is evaluated in terms of a surface code and surface identification of a surface of the object is performed on the basis of the surface code, the drive unit being controlled on the basis of the surface identification;

such that the object is distinguished from other objects carrying different object codes based on the surface code, the surface of the object is distinguished from other surfaces carrying different surface codes and a same object code, such that based on the pattern, the object and the surface of the object are identified a rotation, related to an orientation of the device, of the object about a vertical axis and/or about a horizontal axis is determined;

controlling a control unit to control the drive unit on the basis of the relative localization, when said computer program is run by a computer.

* * * * *